United States Patent [19]

Kraus et al.

[11] 4,179,615
[45] Dec. 18, 1979

[54] FARADAY DISH FOR MAKING MEASUREMENTS AT THE BEAM PATHS OF A HEAVY ION ACCELERATOR

[75] Inventors: Hubert Kraus; Peter Strehl, both of Wixhausen, Fed. Rep. of Germany

[73] Assignee: Gesellschaft fur Schwerionenforschung mbH, Darmstadt, Darmstadt, Fed. Rep. of Germany

[21] Appl. No.: 938,870

[22] Filed: Sep. 1, 1978

[30] Foreign Application Priority Data

Sep. 7, 1977 [DE] Fed. Rep. of Germany ....... 2740227

[51] Int. Cl.² ............................................. B01D 59/44
[52] U.S. Cl. .................................. 250/489; 250/283; 250/398; 315/5.38
[58] Field of Search ............... 250/489, 390, 391, 395, 250/397, 398, 400

[56] References Cited

U.S. PATENT DOCUMENTS

| | | | |
|---|---|---|---|
| 3,368,102 | 2/1968 | Saharian | 315/5.38 |
| 3,780,336 | 12/1973 | Giebeler | 315/5.38 |
| 3,866,085 | 2/1975 | James | 315/5.38 |
| 4,135,097 | 1/1979 | Forneris et al. | 250/398 |

*Primary Examiner*—Harold A. Dixon
*Attorney, Agent, or Firm*—Spencer & Kaye

[57] ABSTRACT

A Faraday dish for making measurements at a beam path of a heavy ion accelerator comprising a supporting structure, a hollow outer conductor and an inner conductor coaxial with the outer conductor. The outer and inner conductors each have a first portion with an open end facing the beam and a second portion perpendicular to the beam path.

10 Claims, 1 Drawing Figure

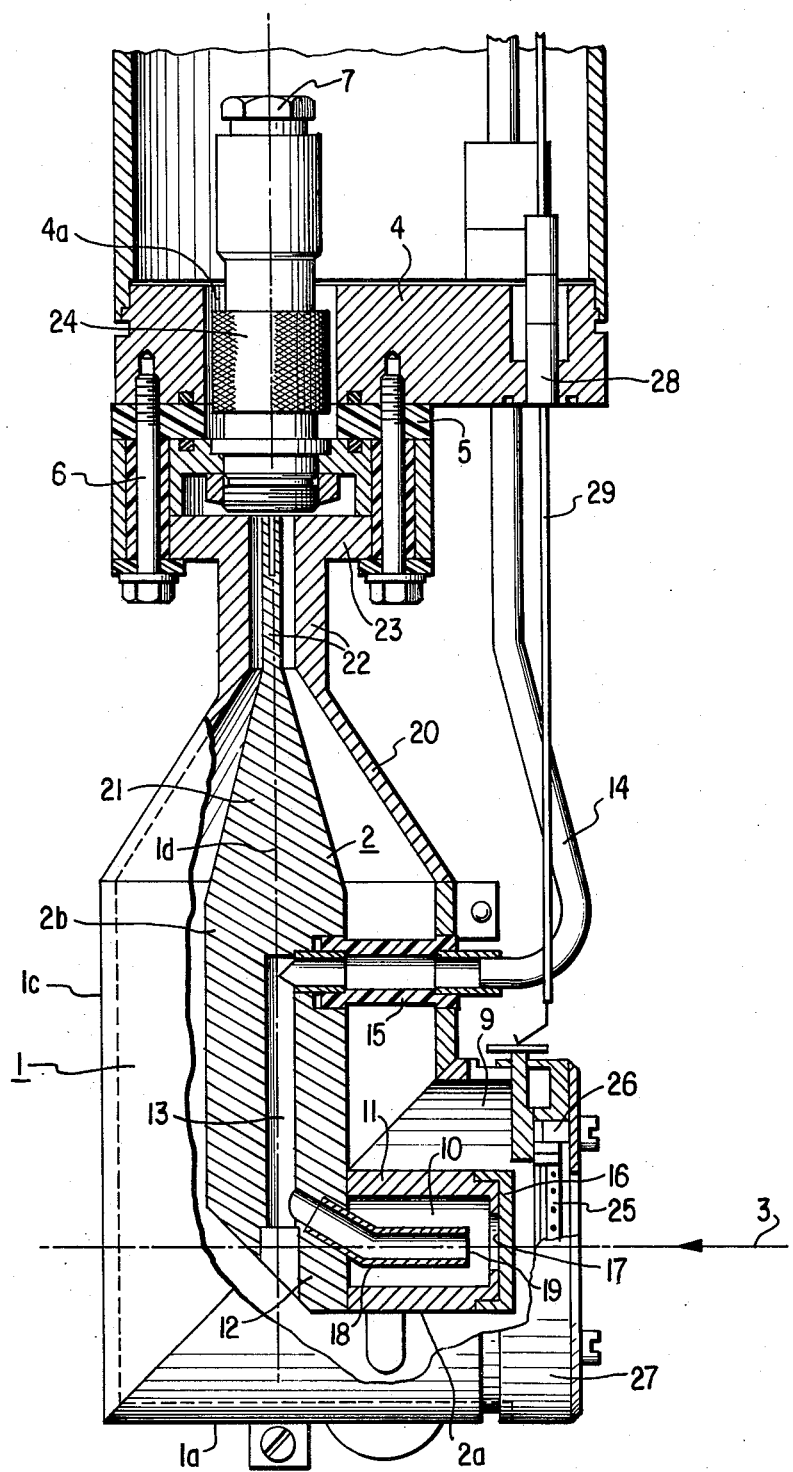

FARADAY DISH FOR MAKING MEASUREMENTS AT THE BEAM PATHS OF A HEAVY ION ACCELERATOR

SUMMARY OF THE INVENTION

The present invention relates to a beam collection device, known as a Faraday dish, for making measurements at the beam paths of a heavy ion accelerator. In particular, the dish comprises a tubular hollow body insulated against the mass of the system and having an opening facing the beam.

In order to measure the micropulse currents and the fine time structure of the particle bunches generated in a high frequency accelerator, it is necessary to transmit frequencies greater than 350 MHz. Such measurements require specially designed Faraday dishes with defined electrical geometry, these dishes being provided to stop the particles and to transmit the time structure of the bunches almost without interference to a fast electronic measuring system. For this purpose, the Faraday dish must meet various requirements:

(1) it must have a bandwidth of at least one GHz;

(2) it must have a 50 ohm output impedance for matching to available broadband amplifiers and real time oscillographs, as well as a standard 50 ohm high frequency cable;

(3) it must be able to withstand high thermal stresses and (4) it must be possible to suppress high frequency fields from secondary particles as well as bunch influence fields.

It is therefore an object of the present invention to provide a beam collection device which meets the above-listed requirements as fully as possible.

This is accomplished by the present invention which employs a Faraday dish of the above-mentioned type in which the hollow body is suspended perpendicularly to the beam and an inner conductor is coaxially inserted therein. Both the inner conductor and the hollow body, which acts as an outer conductor, have portions positioned at 90° with respect to the beam path. It is of particular advantage in this connection for the inner conductor to be hollow and provided, at its open end facing the beam, with a tungsten cover plate. Further, it has been found advantageous for the cover plate to have its rear side cast in copper. The cavity or the inner bores, respectively, of the inner conductor are chargeable with a cooling medium such as water and a small tube leads from the inner bore of the vertical portion of the inner conductor into the cavity of the angled portion of the inner conductor, the open end of this small tube extending closely adjacent to the inner face of the cover plate. A Faraday dish of such design has a very broad bandwidth as well as a very high energy receiving capability. This is achieved by designing the dish body in the form of a bent coaxial line with an internal bore as well as by providing for the direct impingement of cooling water on the collection surface.

A further very advantageous feature of the present invention is that the outer conductor as well as the inner conductor have a conically tapered design at their upper ends facing the suspension to provide a 50 ohm output impedance so that optimum matching to a standard 50 ohm HF plug is made possible.

The present invention further provides that a grid having an electrical lead is placed in the opening of the outer conductor in front of the inner conductor when seen in the direction of the beam, and that the grid is made of tungsten wires fastened in a ceramic ring. Thus, it is possible to shield the various fields (HF, interference fields) and to suppress secondary particles.

BRIEF DESCRIPTION OF THE DRAWING

The sole drawing FIGURE is a cross-sectional view of the Faraday dish according to the invention.

DETAILED DESCRIPTION OF THE PREFERRED EMBODIMENT

Referring now to the sole drawing FIGURE, the primary element of the Faraday dish is designed in the shape of a 50 ohm coaxial waveguide of a type known in the high frequency art. It comprises an outer conductor 1, which is divided in the longitudinal direction, and an inner conductor 2 disposed coaxially in the center of the outer conductor. The outer conductor 1 includes a horizontal portion 1a having an open end 9 and a longitudinal axis 1b coincident with the path of the beam 3 from the heavy ion accelerator. The outer conductor 1 further comprises a vertical portion 1c having a longitudinal axis 1d which is perpendicular to the axis 1b. The inner conductor 2 also has a horizontal portion 2a and a vertical portion 2b, the longitudinal axis of the horizontal and vertical portions 2a, 2b of the inner conductor 2 being coincident with the longitudinal axis of the horizontal and vertical portions 1a, 1c of the outer conductor 1.

The inner conductor 2 is made of copper and the interior of the outer conductor 1 is copper coated. Both are suspended by means of screws 6 and via insulating elements 5 from a plate 4 which can be displaced in the direction of the beam and perpendicular thereto. The primary element 1, 2 is connected by means of a vacuum-tight HF plug 24, which projects through an opening 4a in plate 4, to an HF line 7 which serves to transmit the currents from the vacuum chamber of the accelerator (not shown) to the measuring apparatus. The dish body 1, 2 can be brought into the path of beam 3 with the aid of the displaceable plate 4 which is sealed by means of a seal that is not shown.

At their lower ends facing away from the suspension, both coaxial conductors 1 and 2 are bent at an angle of 90° with respect to the beam 3. The outer conductor 1 is annular in shape with the opening 9 facing the beam 3. The inner conductor is provided with an end piece 11 having a cavity 10 therein and is attached at an angle of 90° to the lower end 12 of the vertical portion 2b of the inner conductor 2.

The vertical portion 2b of the inner conductor 2 is provided with a bore 13 which is connected to two adjacently disposed cooling water connections 14 for intake and discharge. Two ceramic passages 15 are connected into lines 14 and inserted into the dish body 1, 2 in a vacuum-tight manner to electrically insulate the inner conductor 2 and to hold and center it within the outer conductor 1. For reasons of interference protection (avoidance of ground loops) the suspension of the outer conductor 1 is insulated from ground by means of the insulating body 5.

The open end of end piece 11, which forms the portion of the inner conductor 2 facing the beam 3 is closed by a tungsten plate 16 having an inner face 17 cast in copper. Between the bore 13 and the cavity 10 of the end piece there is provided a cooling water connection in the form of a small tube 18 having an open end 19 which extends almost to the inner face 17 of the cover plate 16. At high thermal stresses, the high melting point of tungsten as well as the excellent cooling effect permit additional dissipation of energy.

The outer and inner conductors 1 and 2 have conically shaped upper ends 20 and 21 toward the suspension and thus constitute a conical reduction which provides a 50 ohm output impedance so that the dish can be adapted to a standard HF plug. At the top, the conical ends 20 and 21 open into the cylindrical portion 22 which forms a conventional coaxial waveguide. The fastening member 23 which is screwed to plate 4 is attached to this portion.

In order to suppress secondary particles and to shield against HF influence fields, a grid 25 is disposed in front of the collector plate 16 of the end piece 11 of inner conductor 2 in the opening 9 of the outer conductor 1. The grid 25 is made of tungsten wires which are fastened in a ceramic ring 26. The ceramic ring 26 is held by means of a screw collar ring 27. The distance between the wires of grid 25 and the tungsten plate 16 or the aperture, respectively, is adjustable. The grid voltage across grid 25 is supplied through the vacuum-tight passage 28 of lead 29.

In summary, the advantages of the present invention are essentially a wide bandwidth, a high thermal stressability and the fulfilling of the above-mentioned requirements.

It will be understood that the above description of the present invention is susceptible to various modifications, changes and adaptations, and the same are intended to be comprehended within the meaning and range of equivalents of the appended claims.

What is claimed is:

1. A Faraday dish for making measurements at a beam path of a heavy ion accelerator comprising
   a supporting structure,
   a hollow outer conductor including first and second portions secured to and insulated from said supporting structure, said first portion having an open end, the longitudinal axis of the first portion of said outer conductor being adapted for positioning substantially parallel to said beam path with the open end thereof transverse to said beam path, and the longitudinal axis of the second portion of said outer conductor being perpendicular to the longitudinal axis of the first portion of said outer conductor, and
   an inner conductor having first and second portions positioned within said outer conductor, said first portion having an open end, the longitudinal axes of the first and second portions of said inner conductor being coaxial with the longitudinal axes of the first and second portions of said outer conductor, respectively.

2. A Faraday dish as defined by claim 1 wherein said inner conductor is hollow, and which further comprises a tungsten cover plate covering the open end of the first portion of said inner conductor.

3. A Faraday dish as defined by claim 2 wherein the inner surface of said cover plate facing said inner conductor is composed of copper.

4. A Faraday dish as defined by claim 2 which further comprises a grid structure situated in the open end of the first portion of said outer conductor in front of the first portion of said inner conductor in the direction from which said beam emanates, and means for electrically energizing said grid structure.

5. A Faraday dish as defined by claim 2 which further comprises means for charging the hollow cavity within said inner conductor with a cooling medium.

6. A Faraday dish as defined by claim 5 wherein said hollow cavity comprises first and second hollow portions within the first and second portions of said inner conductor respectively, and which further comprises a tubular element coupling said first and second hollow portions, an open end of said tubular element extending to a position closely adjacent the inner surface of said cover plate.

7. A Faraday dish as defined by claim 6 which further comprises a grid structure situated in the open end of the first portion of said outer conductor in front of the first portion of said inner conductor in the direction from which said beam emanates, and means for electrically energizing said grid structure.

8. A Faraday dish as defined by claim 1 wherein the second portions of said outer conductor and said inner conductor each have a conically reduced section adjacent said supporting structure to provide a 50 ohm output impedance for said dish.

9. A Faraday dish as defined by claim 1 which further comprises a grid structure situated in the open end of the first portion of said outer conductor in front of the first portion of said inner conductor in the direction from which said beam emanates, and means for electrically energizing said grid structure.

10. A Faraday dish as defined by claim 9 which further comprises a ceramic ring secured to said hollow conductor for supporting said grid structure, said grid structure being made of tungsten wires.

* * * * *